US006823428B2

(12) United States Patent
Rodriguez et al.

(10) Patent No.: US 6,823,428 B2
(45) Date of Patent: Nov. 23, 2004

(54) PREVENTING CACHE FLOODS FROM SEQUENTIAL STREAMS

(75) Inventors: Jorge Rolando Rodriguez, Cary, NC (US); James Milton Stephens, Jr., Raleigh, NC (US)

(73) Assignee: International Business, Armonk, NY (US)

( * ) Notice: Subject to any disclaimer, the term of this patent is extended or adjusted under 35 U.S.C. 154(b) by 368 days.

(21) Appl. No.: 10/150,172

(22) Filed: May 17, 2002

(65) Prior Publication Data

US 2003/0217230 A1 Nov. 20, 2003

(51) Int. Cl.$^7$ .............................................. G06F 12/00
(52) U.S. Cl. ..................................... 711/136; 711/133
(58) Field of Search ................................. 711/133, 136

(56) References Cited

U.S. PATENT DOCUMENTS

| | | | | |
|---|---|---|---|---|
| 5,261,066 | A | 11/1993 | Jouppi et al. ................ | 395/425 |
| 5,317,718 | A | 5/1994 | Jouppi ........................ | 695/425 |
| 5,432,919 | A | 7/1995 | Falcone et al. ............. | 395/425 |
| 5,499,354 | A | 3/1996 | Aschoff et al. ............. | 395/456 |
| 5,958,040 | A * | 9/1999 | Jouppi ........................ | 712/207 |
| 6,141,731 | A | 10/2000 | Beardsley et al. ........... | 711/136 |
| 6,260,115 | B1 | 7/2001 | Permut et al. ............... | 711/134 |
| 6,282,613 | B1 | 8/2001 | Hsu et al. ................... | 711/118 |
| 6,327,644 | B1 | 12/2001 | Beardsley et al. .......... | 711/136 |
| 6,539,458 | B2 * | 3/2003 | Holmberg .................... | 711/137 |
| 6,745,295 | B2 * | 6/2004 | Rodriguez .................. | 711/136 |
| 2002/0138700 | A1 * | 9/2002 | Holmberg .................... | 711/137 |
| 2003/0105926 | A1 * | 6/2003 | Rodriguez .................. | 711/129 |

FOREIGN PATENT DOCUMENTS

EP         0469202 A1    2/1992

OTHER PUBLICATIONS

J. Gecsei et al., "Evaluation Techniques for Storage Hierarchies," *IBM Systems Journal*, No. 2, 1970, pp. 78–117.
Pei Cao et al., "A Study of Integrated Prefetching and Caching Strategies," *Sigmetrics*, 1995, pp. 188–197.
H. Siok Jeon, "A Database Disk Buffer Management Algorithm based on Prefetching," *CIKM*, 1998, pp. 167–174.
Valery Soloviev, "Prefetching in Segmented Disk Cache for Multi–Disk Systems," *IOPADS*, 1996, pp. 69–82.
Alan Jay Smith, "Sequentiality and Prefetching in Database Systems," *ACM Transactions in Database Systems*, vol. 3, No. 3, Sep. 1978, pp. 223–247.
Ravi Pendse et al., "Performance of LRU Block Replacement Algorithm with Pre–fetching," *IEEE*, 1999, pp. 86–89.
R. Pendse et al., "Investigation of Impact of Victim Cache and Victim Tracer on a Fully Associative Disk Cache," *IEEE*, 1999, pp. 78–81.
Barbara Tockey Zivkov et al., "Disk Caching in Large Database and Timeshared Systems," *IEEE*, 1997, pp. 184–194.
Norman P. Jouppi, "Improving Direct–Mapped Cache Performance by the Addition of a Small Fully–Associative Cache and Prefetch Buffers," *IEEE*, 1990, pp. 364–373.
"Optimizing the use of a Disk Cache," *IBM Technical Disclosure Bullentin*, vol. 30, No. 9, Feb. 1988, pp. 45–46.

* cited by examiner

*Primary Examiner*—Kevin Verbrugge
(74) *Attorney, Agent, or Firm*—Winstead Sechrest & Minick

(57) ABSTRACT

A method that avoids cache flooding when handling sequential I/O request streams in storage subsystem caches. Both on-demand and prefetched data are addressed. A mechanism is provided that makes the blocks read from the disk array, that are part of a sequential I/O request stream, minimize the evictions of potentially useful data blocks from the cache, thus avoiding the flooding of the cache by stale data.

16 Claims, 6 Drawing Sheets

PREVENTING CACHE FLOODS FROM SEQUENTIAL STREAMS

TECHNICAL FIELD

The present invention relates in general to data processing systems, and in particular, to the caching of data for use by a processor.

BACKGROUND INFORMATION

In microprocessor systems, processor cycle time continues to decrease as technology continues to improve. Also, design techniques of speculative execution, deeper pipelines, more execution elements and the like, continue to improve the performance of processing systems. The improved performance puts a heavier burden on the memory interface since the processor demands data and instructions more rapidly from memory. To increase the performance of processing systems, cache memory systems are often implemented.

Processing systems employing cache memories are well known in the art. Cache memories are very high-speed memory devices that increase the speed of a data processing system by making current programs and data available to a processor ("CPU") with a minimal amount of latency. Large on-chip caches (L1 or primary caches) are implemented to help reduce the memory latency, and they are often augmented by larger off-chip caches (L2 or secondary caches).

The primary advantage behind cache memory systems is that by keeping the most frequently accessed instructions and data in the fast cache memory, the average memory access time of the overall processing system will approach the access time of the cache. Although cache memory is only a small fraction of the size of main memory, a large fraction of memory requests are successfully found in the fast cache memory because of the "locality of reference" property of programs. This property holds that memory references during any given time interval tend to be confined to a few localized areas of memory.

The basic operation of cache memories is well-known. When the CPU needs to access memory, the cache is examined. If the word addressed by the CPU is found in the cache, it is read from the fast memory. If the word addressed by the CPU is not found in the cache, the main memory is accessed to read the word. A block of words containing the word being accessed is then transferred from main memory to cache memory. In this manner, additional data is transferred to cache (pre-fetched) so that future references to memory will likely find the required words in the fast cache memory.

The average memory access time of the computer system can be improved considerably by use of a cache. The performance of cache memory is frequently measured in terms of a quantity called "hit ratio." When the CPU accesses memory and finds the word in cache, a cache "hit" results. If the word is found not in cache memory but in main memory, a cache "miss" results. If the CPU finds the word in cache most of the time, instead of main memory, a high hit ratio results and the average access time is close to the access time of the fast cache memory.

Access patterns described by an I/O request stream can be random or sequential. In a sequential access pattern, access to the file occurs in logically consecutive blocks (e.g., cache lines), whereas random access patterns do not display any regularity in the request stream. The requested blocks in both the random and sequential accesses can be overlapped or disjointed. In the overlapped requests, two or more of the requested blocks are the same, whereas in the disjointed case, no two requests are to the same block. These four access patterns combine together into two distinct categories as follows: (a) overlapped access patterns (both random and sequential) display the property of temporal locality; and (b) sequential access patterns (both overlapped and disjointed) display the property of spatial locality.

Temporal locality means that if a given disk (e.g. hard drive) location is fetched, there is a higher probability that it will be fetched again early in the reference stream rather than later. With temporal locality, the same location is requested two or more times. Spatial locality means that if a given disk location is fetched, there is a higher probability that locations with an address that are close successors (or predecessors) to it will also be fetched, rather than one that is distant. Spatial locality is exhibited by workloads that are sequential in nature and are referred to as sequential I/O request streams. Read lookahead (prefetch) techniques are used to exploit spatial locality. Techniques that exploit temporal locality can be addressed in ways that relate to the data prefetch, and the two are said to be integrated. A cache can be designed take advantage of both temporal and spatial locality.

A primary concern of cache design is the determination of a data block's potential for future reference. While overlapped access patterns do not indicate an increased likelihood for spatial locality, they do exhibit strong temporal locality; that is, there is no reason to assume a random block will not be referenced again, and likely, sooner than later. In contrast, sequential streams indicate strong locality affinity, but due to the nature of the request stream, demonstrate little likelihood that the block will be referenced again in the stream. Data blocks cached as a result of overlapped access patterns have a higher probability of future reference, whereas data blocks cached as a result of sequential access patterns, have a small probability of future reference outside a tight locality window.

The occurrence of sequential I/O request streams can affect the operation of the cache because the cache can be flooded with unproductive data blocks. If the blocks from the sequential stream are stored in the cache after being fetched from disk storage, it is unlikely that these blocks will be referenced again. Furthermore, in order to store the blocks from the sequential stream in the cache, other blocks have to be evicted in order to create space for these blocks. The problem is that the evicted blocks could have been referenced later, but were replaced by blocks that are unproductive after their initial reference. Therefore, the overall effect of loading blocks from a sequential stream into the cache will likely reduce cache hit ratio. The cache is flooded with data that is stale with respect to future accesses.

Read lookahead techniques can be used to take advantage of the sequential streams in the I/O request stream. However, a chronic problem with prefetch techniques has been that the cache can be flooded with unproductive prefetched blocks and read lookahead can actually reduce the performance of the storage subsystem if the prefetched blocks are never referenced. Furthermore, the prefetched blocks can replace cache blocks that would have otherwise been referenced had these remained resident in the cache. Therefore, prefetching does not always improve performance and can actually make the condition of cache flooding in the cache more serious. The cache is flooded with data that is said to be purely speculative with respect to future accesses.

To take the advantage of temporal locality, the retrieved blocks, or lines, of data are time-stamped and organized within the cache in a least recently used ("LRU") order. However, a conflict occurs since LRU-based caches are not as effective for taking advantage of spatial locality. Instead, read lookahead (prefetching) techniques are preferred for spatial locality. But, as noted above, such techniques can evict needed data from the cache.

SUMMARY OF THE INVENTION

The present invention describes a method that alleviates cache flooding when handling sequential I/O request streams in storage subsystem caches. Both on-demand and prefetched data are addressed. A mechanism is provided that makes the blocks read from the disk array, that are part of a sequential I/O request stream, minimize the evictions of potentially useful data blocks from the cache, thus avoiding the flooding of the cache by stale data.

The system comprises a cache, including the cache directory, and a sequential I/O request stream tracer, which serves as a secondary directory subservient to the cache directory. As a tracer, the secondary directory (Sequential Stream Tracer) in this design may not contain any associated data, except for the data in the cache with which the Sequential Stream Tracer is associated through the main directory. The Sequential Stream Tracer may consist of references to the cache directory entries that correspond to data blocks constituting sequential access patterns. In this manner, the tracer merely tracks the sequential stream data blocks, providing a single service point for controlling cache floods. The tracer may be organized as an array of multiple least recently used (LRU) stacks, where each LRU stack corresponds to a sequential access pattern. The tracer table maintains a number of LRU stacks responsible for storing primary cache directory entries that in turn point to the most recent data blocks fetched from disk to satisfy that sequential stream's requests (including those blocks, if any, that are fetched as a result of native prefetch algorithms).

The I/O requests from each stream do not normally occur in consecutive positions in the request target, but are instead interleaved with the entries from other sequential streams. These multiple streams may be detected and the individual requests stored in a different tracer entry. The larger the run length of the sequential request stream associated with the I/O request target, the fewer number of individual transactions may be handled by the request. Following this argument, one can also determine that for a sequential stream with large run lengths, there can only be a smaller number of sequential streams appearing in the request stream. On the other hand, one can also determine that for a sequential stream with small run lengths or no sequential streams present, there can be a relatively larger number of sequential streams and non-sequential requests appearing to the request target. This is even more true when compared with a purely random request stream (the average run length is 0).

One advantage of the tracer design of the present invention is a low cost solution requiring a small number of buffers (as required to detect the beginning of new sequential streams in the request stream and in the directory and to store these streams).

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
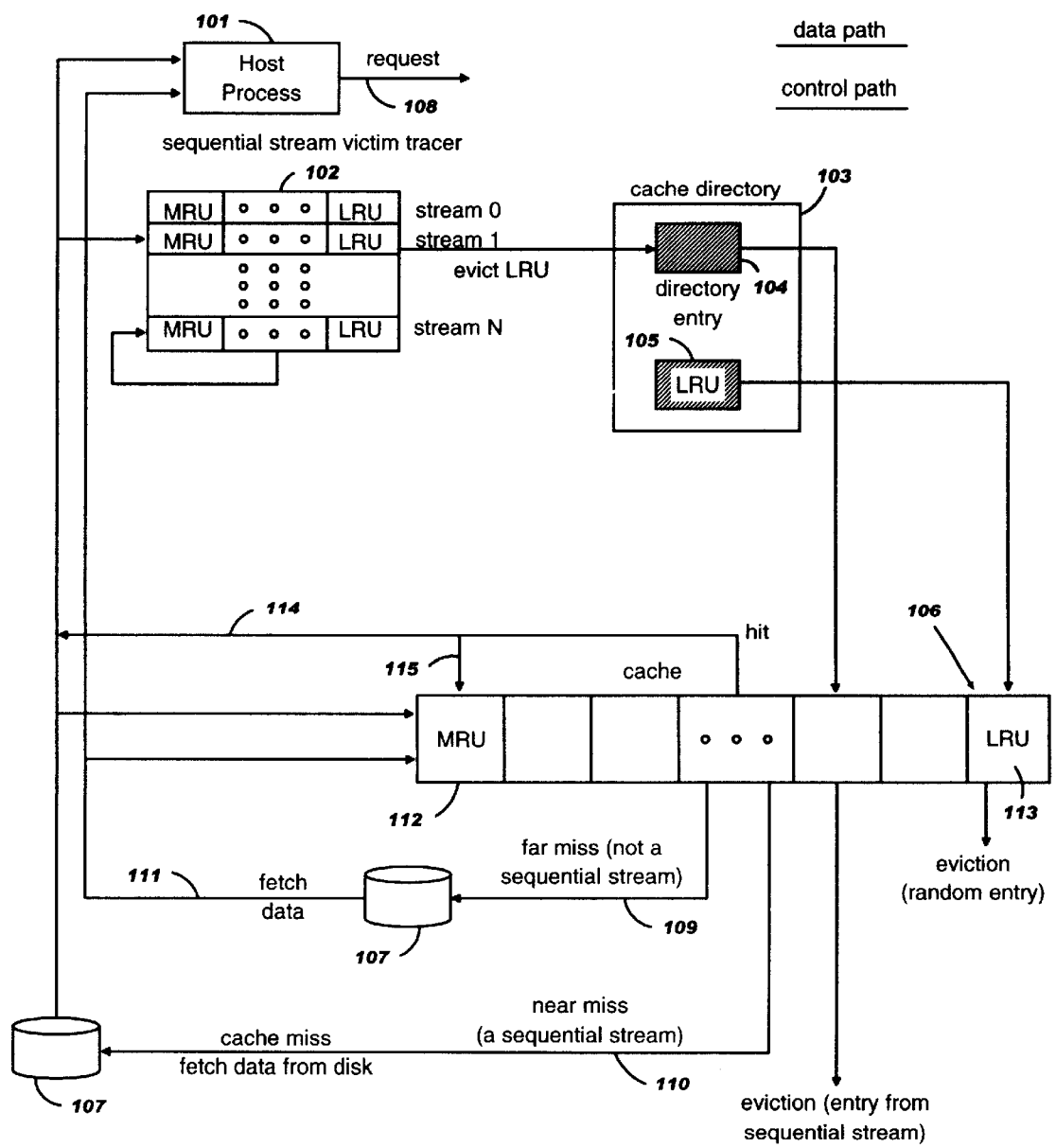
FIG. 1 illustrates a block diagram of data flow within a system of the present invention.

In the following description, numerous specific details are set forth such as specific block sizes, buffer capacities, cache sizes, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present method incorporates features to avoid cache flooding when handling sequential I/O (input/output) request streams and storage subsystem caches. If prefetch is not used or disabled, then a mechanism is provided that makes the blocks read from the disk array that are part of a sequential I/O request stream minimize evictions of potentially useful data blocks from the cache, thus avoiding the flooding of the cache by stale data (data fetched but no longer needed by the processor). If prefetch is enabled and used, then a mechanism is provided that makes the blocks read from the disk array that are part of a sequential I/O request stream minimize evictions of potentially useful data blocks from the cache, thus avoiding the flooding of the cache by speculative data (data retrieved from memory in anticipation that it will be needed by the processor).

Referring to FIG. 1, the system includes a cache 106, a cache directory 103, and a Sequential Stream Victim Tracer 102 that serves as a secondary directory subservient to the cache directory 103. As a tracer, the Sequential Stream Victim Tracer 102 does not contain any data, except for the data in the cache 106, with which the Sequential Stream Victim Tracer 102 is associated through the cache directory 103. The cache directory 103 continues in its responsibility to determine whether data blocks are present in the cache 106 and in implementing any global cache shrinking by means of data block evictions. The Sequential Stream Victim Tracer 102 contains references to the cache directory entries 104 that correspond to data blocks constituting sequential access patterns. In this manner, the tracer 102 merely tracks the sequential stream data blocks, providing a single service point for controlling cache floods. The tracer 102 is organized as an array of multiple least recently used (LRU) stacks (e.g., streams 0 ... N), where each LRU stack corresponds to a sequential access pattern. The tracer table maintains a number of least recently used (LRU) stacks responsible for storing primary cache directory entries that in turn point to the most recent data blocks fetched from disk 107 to satisfy that sequential stream's requests (including those, if any, blocks that were fetched as a result of any native prefetch algorithms).

Figure 2:
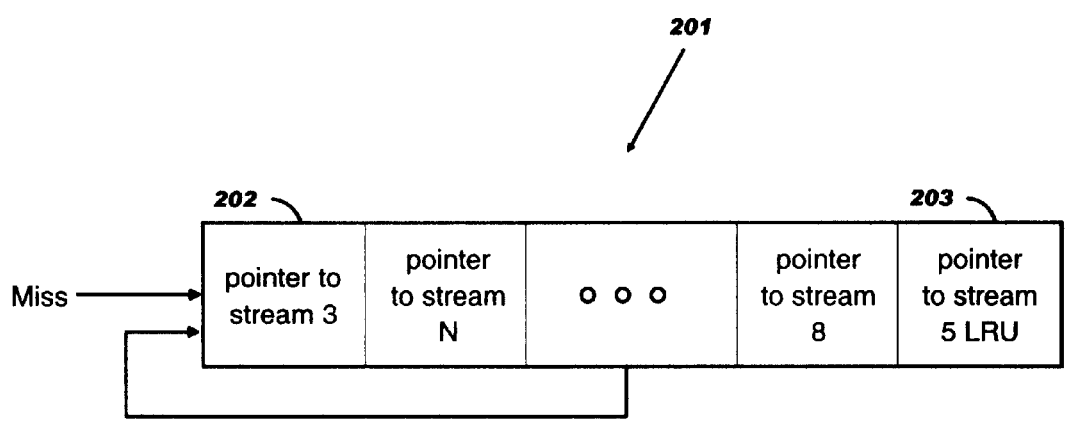
FIG. 2 illustrates a sequential trace buffer.

The number of streams supported in the tracer 102 can be determined from an analysis of the expected workloads, with a focus on the sequentiality of the request stream. The number of streams supported by the tracer 102 can be allowed to grow (within reason) by extending the linked lists that are used in the implementation of the tracer 102. If the number of different streams can be larger than is desired for the specifications of a given implementation, then the Victim Sequential Stream Selector 201 illustrated in FIG. 2 can be used to manage the size of the tracer 102 by evicting streams from the tracer 102 in an LRU fashion (following a policy of least recently used entry as a candidate for eviction from the tracer 102). This selector 201 is structured as an LRU stack, and contains a pointer to the MRU entry for each of the stream arrays in the tracer 102. The selector 201 is associated with the tracer 102, but is not shown in FIG. 1 for reasons of clarity. Selector 201 implements an LRU replacement algorithm that controls the sequential stream victim tracer 102, to evict the LRU stream. Pointer 202, then, points to the LRU stream in the tracer 102. The LRU location 203 in the selector 201 contains a pointer to the stream array (e.g. stream 5) that gets replaced when the presence of a new sequential stream is detected in the I/O request stream and it will need to have space allocated in the tracer 102. The selector stack 201 is shifted to the right and the old LRU 203 is evicted. The new stream becomes the new MRU entry in the selector 201, where the MRU location contains a pointer to the tracer position containing the victim stream array location. The new sequential stream is loaded into the position indicated by that pointer.

Referring again to FIG. 1, operation of the cache 106 is explained. An algorithm that has the ability to detect the beginning of a sequential stream interleaved within the I/O request stream is applied. The beginning of a sequential stream can be detected by comparing the logical block number of some request 108 from the host process 101 to the logical block numbers of blocks previously fetched and currently stored in the cache 106. The request 108 generates a fetch from disk 107, and the block is stored within the cache 106. Furthermore, any disk fetches resulting from a native prefetch algorithm are also transferred from disk 107 and placed in the cache 106. Directory information associated with each of the referenced blocks is stored in the tracer 102 in order to keep track of additional references to the sequential stream.

When the data is not found in the cache 106 (a cache miss) and the address of the requested data is more distant than N (N is an integer) positions from all the entries in the tracer 102, then this is defined as a cache far miss. Far misses involve blocks that are not part of the sequential stream. A far miss in the cache 106 generates a request 109 to the disk array 107 and the fetched data 111 is stored in the cache 106, leaving the tracer 102 unmodified.

When the data is not found in the cache 106 (a cache miss), but the address of the requested data is within successor N entries or predecessor N entries of other entries in the tracer 102, then this is defined as a cache near miss. A near miss is used to detect the beginning or continuation of a sequential stream. A near miss in the cache 106 generates a request 110 to the disk array 107, the data is stored in the cache 106, and both the main and trace cache directories 103, 102 are updated accordingly.

The tracer 102 maintains a finite set of cache directory 103 entries, dictated by the tracing depth. If the tracer entry for the sequential stream generating this particular request already contains as many elements as the tracing depth dictates, but the cache 106 is not full (there is no need to invoke the native data block eviction/replacement algorithm), then the tracer 102 drops its reference to a set of the least recently used data blocks (which does not remove the blocks from the cache 106) and stores the cache entries associated with the current request into the tracer 102.

Sequential stream tracing ends when the directory block within the Sequential Stream Victim Tracer 102 specified to be the next sequential address does not get a "hit." Not getting a hit indicates the end of the sequential run, at least within the time window available for the detection of sequentiality.

The cache replacement algorithm for the cache 106 is not described here, except for certain requirements necessary for the tracer implementation. The purposes of the flood prevention mechanisms do not dictate a cache replacement policy for the cache 106 and are meant to inter-operate with the widest variety of native designs. It is likely that any implementation will employ elements of a least frequently used (LFU) and LRU algorithm, and will, for illustration purposes, be the assumed underlying policy. A frequency count and a time stamp are kept in the directory for each entry, as required by the LRU and LFU techniques.

When the cache 106 becomes filled with data blocks, new fetches require that existing cache entries be evicted in order to free space for new data blocks. Cache replacement policies determine which blocks provide the best candidates for being discarded from the cache 106. The ability to accurately select blocks with the most reduced likelihood of being requested in the near future can dramatically improve cache hit ratios. An excess of data blocks fetched for the purposes of sequential I/O requests can flood the cache 106 with both stale and speculative data. However, the access pattern of the sequential stream demonstrates a greatly reduced likelihood a future needs for a previously fetched block. This characteristic of the request stream undermines the native cache replacement algorithm's ability to effectively manage the cache 106 to maximize hit ratios.

Figure 3:
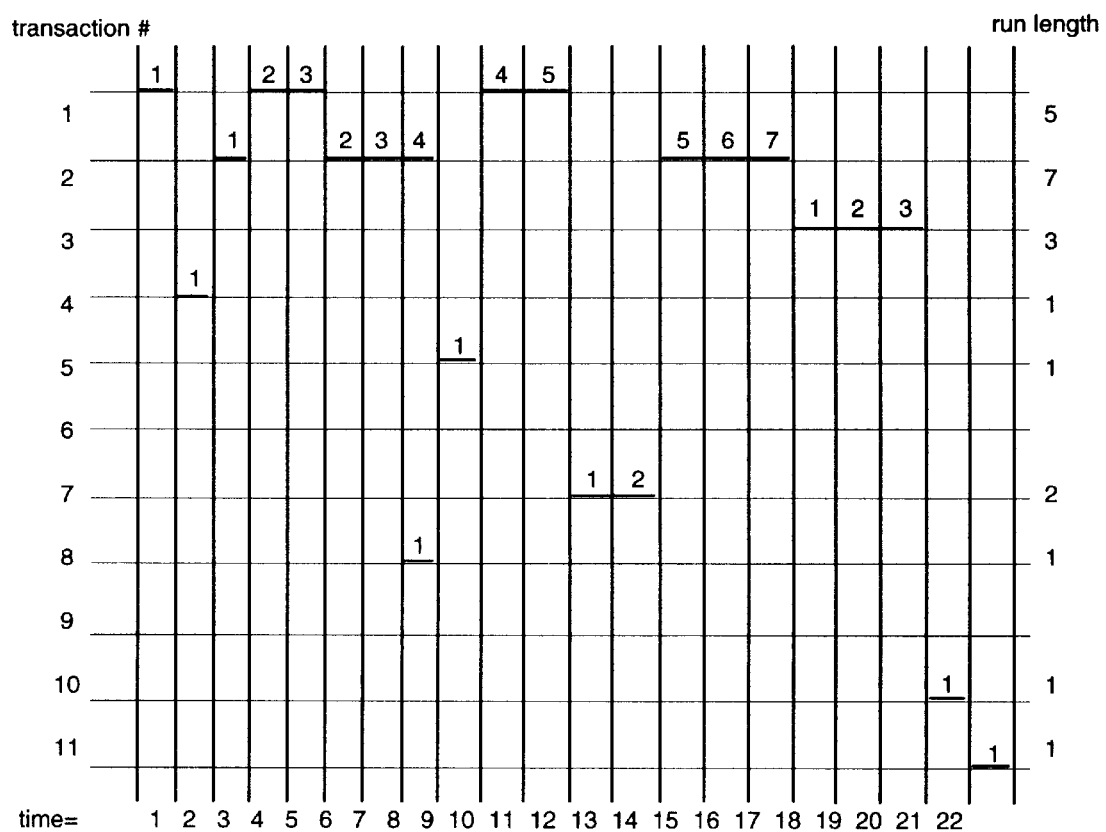
FIG. 3 illustrates superposition of sequential streams.

The present invention can support a variable number of concurrent sequential I/O request streams as candidates for the tracer 102. There can be multiple independent sequential request streams superimposed on the same I/O request target as illustrated in FIG. 3. The I/O requests from each stream do not normally occur in consecutive positions in the request target, but are instead interleaved with the entries from other sequential streams. These multiple streams need to be detected and the individual requests stored in a different tracer entry.

The larger the run length of the sequential request stream associated with the I/O request target, the fewer number of individual transactions will be handled by the request. Following this argument, one can also determine that for a sequential stream with large run lengths there can only be a smaller number of sequential streams appearing the request stream. On the other hand, one can also determine that for a sequential stream with small run lengths or no sequential streams present, there can be a relatively larger number of sequential streams and non-sequential requests appearing to the request target. This is even more true when compared with a purely random request stream (the average run length is 0). This means that only a small number of buffers used to detect the beginning of new sequential streams in the request stream and in the directory may be required.

When a request 108 results a hit in the cache 106, the data in that entry is sent to the requesting process in the host 101. The block is moved to the most recently used position 112 in the cache 106 and its frequency counter (not shown) is incremented.

When a request 108 misses the cache 106, and is determined not to constitute a sequential request stream, either because the I/O target has never been accessed before or the current request issued generated a far miss, provided the cache is full, the native replacement policy is invoked, and data blocks are removed according to their relative value. In this respect, the tracer 102 provides no protection to entries currently residing in its directory. The tracer 102 does not undermine the cache's eviction policy.

When a request 108 misses the cache 106, but is determined to constitute a sequential request stream (near miss), the tracer 102 preempts the cache's replacement algorithm. Rather than allowing the primary replacement algorithm to evict potentially useful blocks, the tracer 102 design invokes an internal eviction policy. The internal policy is responsible for selecting as many of the least recently used data blocks as required to store the current request's load from storage 107. The tracer 102 not only removes its own references to these data blocks, but additionally, instructs the cache 106 to remove these data blocks from the cache 106 as well. The tracer 102 allows only as many blocks to be fetched from disk 107 as it has just freed from the cache structure 106, thereby preventing floods of data blocks into the cache 106 and the resulting eviction of potentially useful data blocks.

In order to prevent the creation of tracer entries pointing to cache directory 103 entries that have been evicted by random fetches, every time that an LRU entry 113 is evicted from the cache 106, a check is made to determine whether that was part of a sequential stream. That can be achieved by either keeping a bit in the main directory 103 that identifies entries as sequential or random, or by searching the tracer 102 to determine if the entry is part of a sequential stream stored in the tracer 102. Either way, if it is in the tracer 102, then that entry is evicted from the tracer 102 along with any other entries between that entry and the LRU entry of that stream.

Figure 4A:
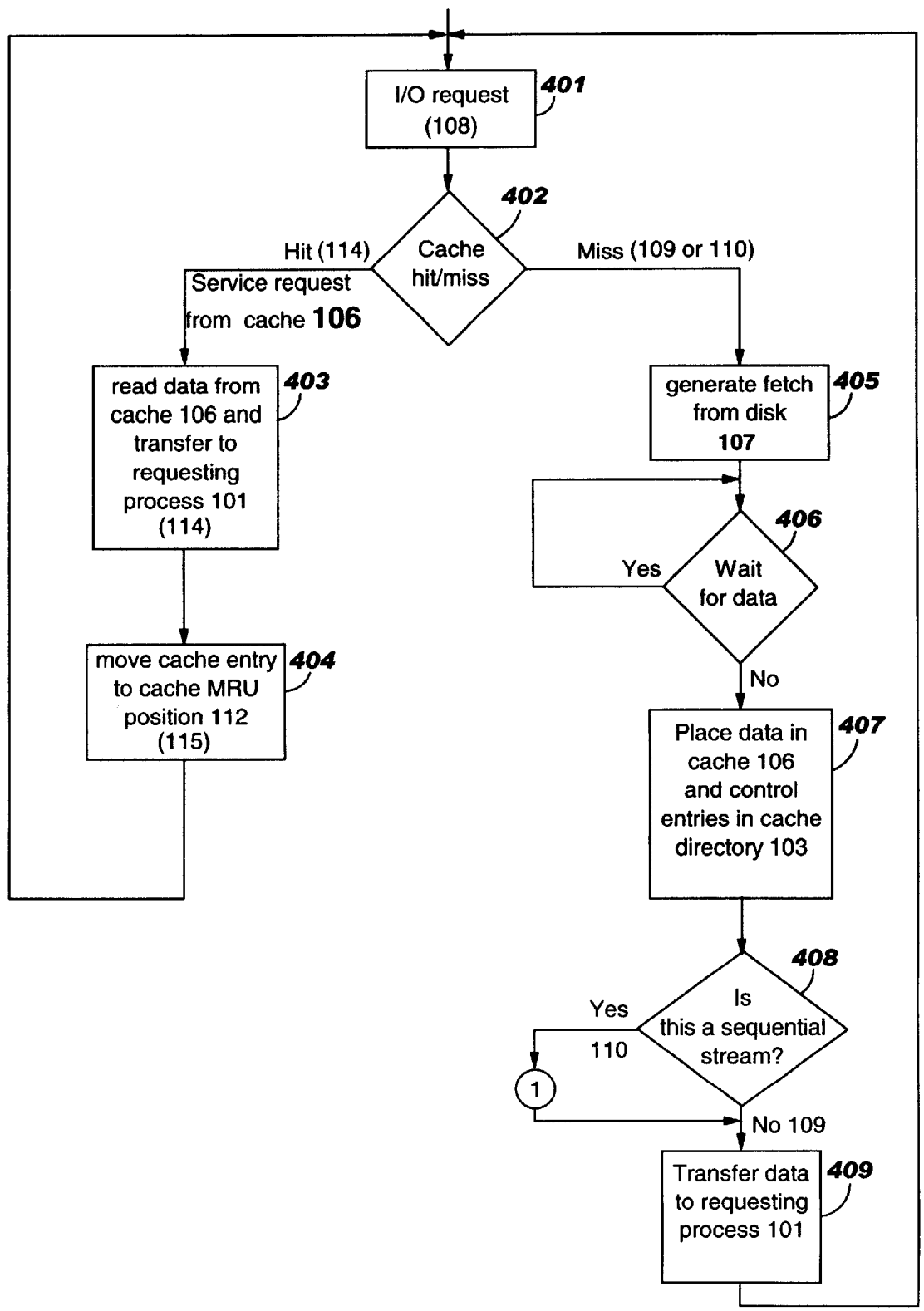
FIGS. 4 (4A, 4B, and 4C) illustrates a flow diagram.
Figure 4B:
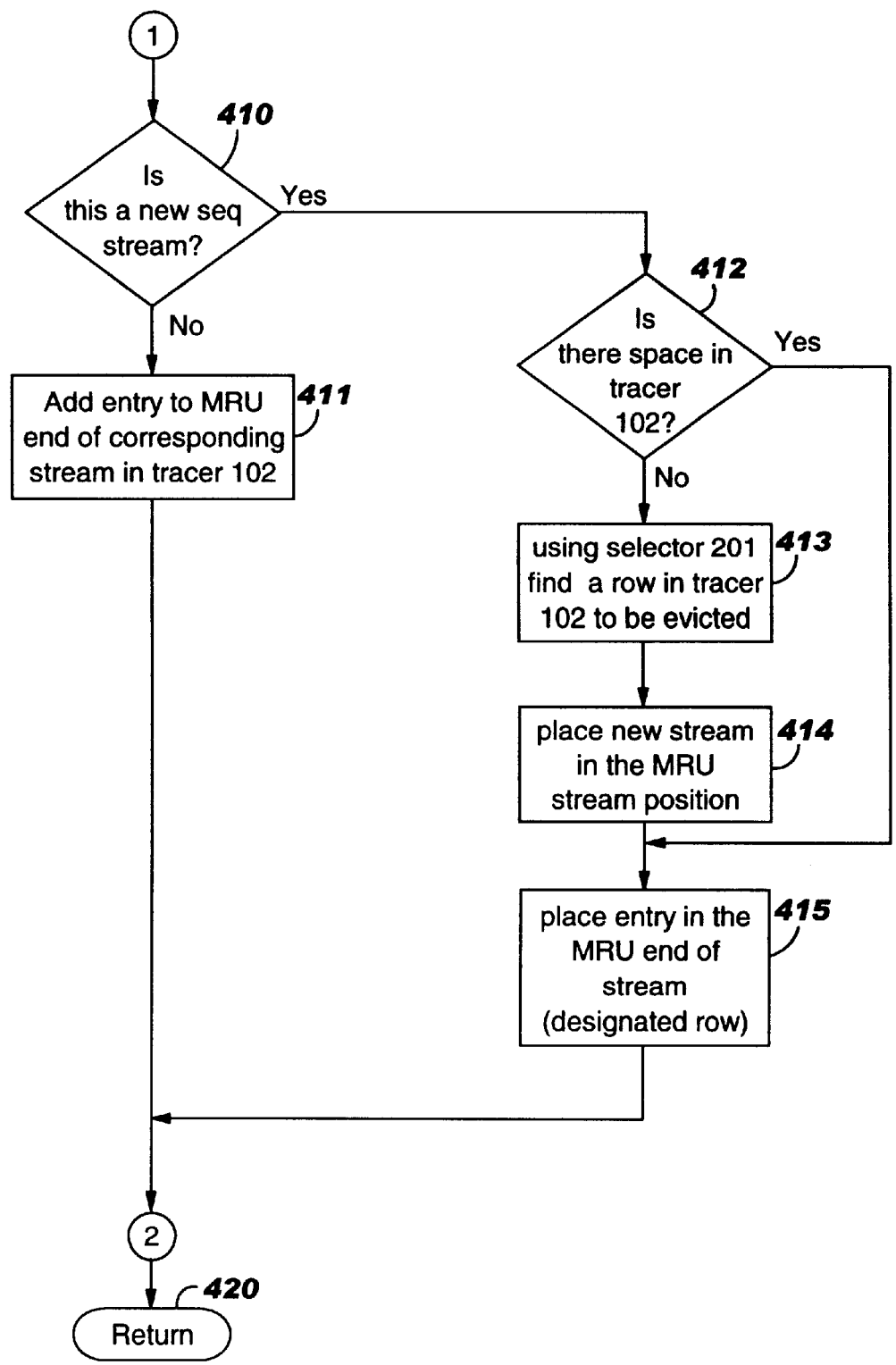
Figure 4C:
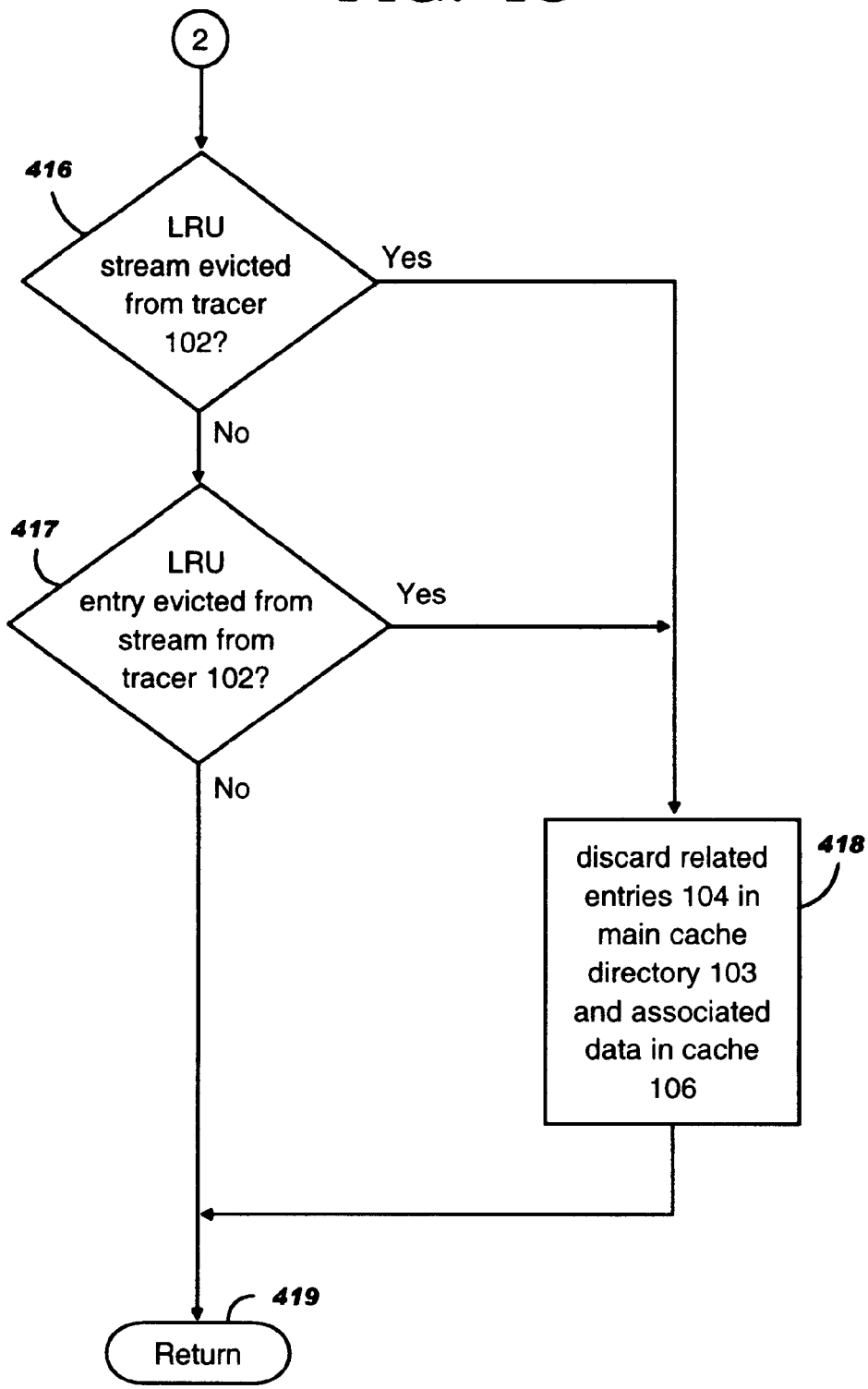

Referring to FIGS. 4A–4C, an operation of an embodiment of the present invention is described with respect to a flow diagram. In step 401, an I/O request 108 is issued. In step 402, it is determined whether there is a cache hit or miss. If there is a cache hit 114, then the request will be serviced from an entry in the cache 106. Data will be read from cache 106 in step 403 and transferred to the requesting host process 101, shown by label 114. In step 404, the cache entry associated with the hit will be moved to the cache MRU position 112 as shown by label 115. Then the process then returns to step 401.

If in step 402, there is a cache miss 109 or 110, then in step 405, the requested data will be fetched from disk 107. In step 406, the process waits for return of the data from disk 107. In step 407, the data will be placed in an entry in cache 106, and control entries in cache directory 103 will be entered. Next, in step 408, it is determined whether the cache miss is within an existing sequential stream. If not, then this is designated as a far miss 109, and the process immediately proceeds to step 409 to transfer the data to the requesting process, and then returns to step 401. However, if in step 408 it is to determined that this is a near miss 110, then the process proceeds to step 410 shown in FIG. 4B. In step 410, it is determined whether this is a new sequential stream. If not, then in step 411, an entry is added to the MRU end of the corresponding stream within tracer 102. However, if this is a new sequential stream, then the process will proceed to step 412 to determine whether there is any space available within tracer 102. If there is space available, the process will skip to step 415 to place the entry within the MRU end of the new stream in a designated row. If there is not any space within tracer 102, then in step 413, selector 201 (see FIG. 2) will be used to find a row within tracer 102 to be evicted. In step 414, the new stream will be placed in the MRU stream position, and then in step 415, an entry will be placed in the MRU end of this stream. After step 415, the process will then proceed to step 416 (see FIG. 4C).

In step 416, it is determined whether the LRU stream should be evicted from tracer 102. If not, then at step 417, it is determined whether the LRU entry is evicted from stream i in tracer 102. If not, the process returns 419 to the return step 420 in FIG. 4B. Step 420 returns the process to step 409 in FIG. 4A.

If an LRU stream is evicted from tracer 102, or if an LRU entry is evicted from stream i in tracer 102, the process proceeds to step 418 to discard related entries 104 within the cache directory, 103 and also discards associated data entries within cache 106.

The method described here provides a low-cost design point to determining the appropriate tracing depth sizing. There are two qualities of sequential streams that effect the volume of the tracer: the run length of the sequential stream and the number of independent sequential streams. The total set size for all traced data blocks will be the product of the mean run length and the number of independent sequential I/O streams. As either factor grows, the cache becomes effectively flooded by the sum of the sequential data blocks. Note, the underlying cache replacement policy will still arbitrate, as expected, the relative values of the competing data blocks, evicting those determined to be less likely to be referenced in the near future.

Limiting the number of sequential streams traced provides no advantage to maximizing cache hit ratios; sequential streams that are not traced can flood the cache with unproductive blocks (as described above) and worsen the hit rates of an already full cache.

An approach to controlling the cache real estate consumed by the sequential streams is to tune the tracing depth. The tracing depth represents the length or number of data blocks actively traced by the cache flood prevention mechanisms, and effectively the penetration depth of the worst case cache flood. The optimal tracing depth can only be determined with respect to load characteristics and available system memory (or maximum capacity of the storage subsystem cache). Nevertheless, a guidepost to tuning the tracing depth is the aggressiveness of the prefetch algorithm. In systems that use prefetching to speculatively cache data blocks, the tracing depth should be no less than the sum of the request size and prefetch amount. As most well designed caches employ complex adaptive prefetch algorithms, the static tracing depth should be a functional value no less than the maximum prefetch.

Tracers that adaptively determine tracing depth must also recognize the prefetch packet size is a lower bound. If available memory or advanced knowledge of I/O subsystem workloads justify more aggressive tracing depths, those depths should be dynamic, changing as a function of cache resource contention and variations in the workload. However, tracing depths must continue to be greater than the prefetch aggressiveness at that load context.

Although the present invention and its advantages have been described in detail, it should be understood that various changes, substitutions and alterations can be made herein without departing from the spirit and scope of the invention as defined by the appended claims.

What is claimed is:

1. A data processing system comprising:
   a processor;
   a cache memory coupled to the processor; and
   a sequential stream tracer containing first entries identifying data blocks within a first stream of N (N is a positive integer) consecutive blocks fetched into the cache memory, wherein the sequential stream tracer includes circuitry for causing an eviction of first M (M is a positive integer) data blocks from the cache memory corresponding to first least recently used (LRU) entries evicted from the sequential stream tracer when additional first M data blocks are retrieved into the cache memory.

2. The system as recited in claim 1, further comprising:
   circuitry for adding M entries into the sequential stream tracer identifying the additional M data blocks retrieved into the cache memory, wherein the addition of the M entries into the sequential stream tracer causes the LRU entries to be evicted.

3. The system as recited in claim 2, wherein the entries identifying data blocks within the stream of N consecutive blocks are ordered in the sequential stream tracer from most recently used (MRU) to the LRU.

4. The system as recited in claim 1, wherein the sequential stream tracer contains second entries identifying data blocks within a second stream of N (N is a positive integer) consecutive blocks fetched into the cache memory, wherein the sequential stream tracer includes circuitry for causing an eviction of second M (M is a positive integer) data blocks from the cache memory corresponding to second least recently used (LRU) entries evicted from the sequential stream tracer when additional second M data blocks are retrieved into the cache memory.

5. The system as recited in claim 4, further comprising:
   circuitry for adding first M entries into the sequential stream tracer identifying the additional first M data blocks retrieved into the cache memory, wherein the addition of the first M entries into the sequential stream tracer causes the first LRU entries to be evicted.

6. The system as recited in claim 5, wherein the first entries identifying data blocks within the first stream of N consecutive blocks are ordered in the sequential stream tracer from most recently used (MRU) to the LRU.

7. The system as recited in claim 6, further comprising:
   circuitry for adding second M entries into the sequential stream tracer identifying the additional second M data blocks retrieved into the cache memory, wherein the addition of the second M entries into the sequential stream tracer causes the second LRU entries to be evicted.

8. The system as recited in claim 7, wherein the second entries identifying data blocks within the second stream of N consecutive blocks are ordered in the sequential stream tracer from most recently used (MRU) to the LRU.

9. The system as recited in claim 4, further comprising:
   a sequential stream tracer directory organizing the first and second streams relative to each into a LRU order, and further comprising circuitry for evicting the second stream if it is the LRU and another stream has been fetched.

10. A sequential stream tracer comprising:
    a first stream containing a first plurality of entries identifying a first plurality of data blocks resident within an associated cache, wherein the first plurality of data blocks are within a first stream of sequentially addressed data blocks, wherein the first plurality of entries are ordered in the first stream in a least recently used manner with respect to each other; and
    a second stream containing a second plurality of entries identifying a second plurality of data blocks resident within an associated cache, wherein the second plurality of data blocks are within a second stream of sequentially addressed data blocks, wherein the second plurality of entries are ordered in the second stream in a least recently used manner with respect to each other.

11. The sequential stream tracer as recited in claim 10, further comprising:

circuitry for adding a first entry to the first plurality of entries, wherein the first entry identifies a data block fetched to the cache; and if the first stream is full, evicting a LRU entry from the first stream, which causes eviction of a data block identified by the LRU entry from the cache.

12. The sequential stream tracer as recited in claim 10, further comprising:

a sequential stream tracer directory for organizing indicators corresponding to the first and second streams in a least recently used order, wherein if a new stream is received in the sequential stream tracer, the least recently used stream will be evicted resulting in data blocks in the associated cache and identified by the least recently used stream also being evicted from the associated cache.

13. A method comprising the steps of:

storing a first sequential stream of N consecutive data blocks in a cache;

maintaining a first plurality of entries in a stream tracer that correspond to each of the N consecutive data blocks in the cache, wherein the first plurality of entries in the stream tracer are organized in a least recently used order;

retrieving M data blocks to add to the first sequential stream of N consecutive data blocks in the cache;

in response to the retrieving step, adding M entries corresponding to the retrieved M data blocks to the first plurality of entries in the stream tracer, wherein the M entries are inserted as most recently used entries; and if the addition of the M entries to the first plurality of entries exceeds a capacity of the stream tracer, then evicting a number of least recently used entries exceeding the capacity causing the corresponding data blocks in the cache to be evicted.

14. The method as recited in claim 13, wherein the retrieving step results from a cache miss operation.

15. The method as recited in claim 13, further comprising the steps of:

storing a second sequential stream of N consecutive data blocks in a cache;

maintaining a second plurality of entries in a stream tracer that correspond to each of the N consecutive data blocks in the cache, wherein the second plurality of entries in the stream tracer are organized in a least recently used order;

retrieving M data blocks to add to the second sequential stream of N consecutive data blocks in the cache;

in response to the retrieving step, adding M entries corresponding to the retrieved M data blocks to the second plurality of entries in the stream tracer, wherein the M entries are inserted as most recently used entries; and if the addition of the M entries to the second plurality of entries exceeds a capacity of the stream tracer, then evicting a number of least recently used entries exceeding the capacity causing the corresponding data blocks in the cache to be evicted.

16. The method as recited in claim 15, further comprising the steps of:

maintaining a directory of entries corresponding to each of the first and second streams in the stream tracer, wherein the directory of entries are organized in a least recently used order; and evicting the least recently used stream if a new stream is retrieved for insertion into the cache.

* * * * *